United States Patent
Cheng et al.

(10) Patent No.: US 11,240,352 B2
(45) Date of Patent: Feb. 1, 2022

(54) COMPRESSOR AND DECOMPRESSOR BASED ON ROBUST HEADER COMPRESSION

(71) Applicant: REALTEK SEMICONDUCTOR CORPORATION, Hsinchu (TW)

(72) Inventors: Chin Cheng, Taipei (TW); Xiaolu Ma, Suzhou (CN); Yixin Huang, Changshu (CN); Runrun Wei, Wuxi (CN); Nengan Gong, Ma'anshan (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 41 days.

(21) Appl. No.: 16/726,297

(22) Filed: Dec. 24, 2019

(65) Prior Publication Data
US 2020/0252484 A1  Aug. 6, 2020

(30) Foreign Application Priority Data

Jan. 31, 2019  (CN) .......................... 201910098351.3

(51) Int. Cl.
*H04L 29/06* (2006.01)
*H04W 28/06* (2009.01)

(52) U.S. Cl.
CPC ............ *H04L 69/04* (2013.01); *H04L 65/608* (2013.01); *H04L 69/16* (2013.01); *H04L 69/22* (2013.01); *H04W 28/06* (2013.01)

(58) Field of Classification Search
None
See application file for complete search history.

(56) References Cited

U.S. PATENT DOCUMENTS

| | | | | |
|---|---|---|---|---|
| 5,337,275 A | * | 8/1994 | Garner ................. | G06F 3/0601 365/185.11 |
| 7,512,716 B2 | * | 3/2009 | Pelletier ................. | H03M 7/30 709/236 |
| 7,876,695 B2 | * | 1/2011 | Johansson ............... | H04L 69/04 370/252 |
| 8,218,499 B2 | | 7/2012 | Lecompte | |
| 2004/0039830 A1 | * | 2/2004 | Zhang .................. | H04L 69/161 709/230 |
| 2007/0058679 A1 | * | 3/2007 | Pelletier ................. | H04L 69/04 370/477 |

(Continued)

FOREIGN PATENT DOCUMENTS

CN          101283620          10/2008

OTHER PUBLICATIONS

Taiwan Intellectual Property Office, Office Action letter of the counterpart TW application (appl. No. 108109934) dated Jan. 31, 2020. English Summary of the OA letter on p. 1.

(Continued)

*Primary Examiner* — Kenny S Lin
(74) *Attorney, Agent, or Firm* — WPAT, PC (57) ABSTRACT

Robust Header Compression (RoHC) compressors and decompressors are provided. A RoHC compressor includes a memory and a processor. The memory stores multiple contexts and multiple codes or program instructions. The processor executes the codes or the program instructions to perform the following steps: receiving a header flow; freeing at least one of the contexts when free space of the memory is insufficient; compressing the header flow; and transmitting the compressed header flow.

5 Claims, 7 Drawing Sheets

(56) References Cited

U.S. PATENT DOCUMENTS

| | | | |
|---|---|---|---|
| 2007/0070995 A1* | 3/2007 | Pelletier | H04L 69/04 370/389 |
| 2007/0195764 A1* | 8/2007 | Liu | H04W 28/24 370/389 |
| 2010/0027497 A1* | 2/2010 | Pelletier | H04W 28/06 370/329 |
| 2011/0158166 A1* | 6/2011 | Lee | H04L 69/04 370/328 |
| 2015/0063103 A1* | 3/2015 | De Smet | H04L 69/04 370/230 |
| 2017/0033911 A1* | 2/2017 | Bressanelli | H03M 13/6306 |
| 2018/0124639 A1* | 5/2018 | Bathwal | H04L 69/04 |
| 2020/0304604 A1* | 9/2020 | Zhao | H04W 28/06 |

OTHER PUBLICATIONS

C. Bormann et al., "RObust Header Compression (ROHC): Framework and four profiles: RTP, UDP, ESP, and uncompressed", Jul. 2001, p. 1-p. 168, The Internet Society (2001).

\* cited by examiner

COMPRESSOR AND DECOMPRESSOR BASED ON ROBUST HEADER COMPRESSION

BACKGROUND OF THE INVENTION

1. Field of the Invention

The present invention relates to Robust Header Compression (RoHC), and, more particularly, to memory full handling at the RoHC compressors and decompressors.

2. Description of Related Art

RoHC is applied to wired or wireless networks where the headers of the packets need to be compressed. As certain messages in consecutive packets of a same data stream contain constant information, headers are compressed to make effective use of the band resources of wired or wireless networks. Headers can be compressed by transmitting complete header messages in only the first one or more packet(s) of a data stream and transmitting the varying parts of the header messages in subsequent packets of the same data stream. Since only the varying parts are transmitted, the receiver and the transmitter are each provided with memories that store the unchanging parts (the stored memory data are referred to in general as a context) to restore the original complete header.

For example, if there are a header flow A whose destination IP address is 0.0.0.1 and a header flow B whose destination IP address is 0.0.0.2, the compressor needs to create two contexts to respectively store the data of the header flow A and the data of the header flow B, and, similarly, the decompressor also needs to create two contexts to respectively store the data of the header flow A and the data of the header flow B. As a result, when the compressor or decompressor needs more contexts to store the data of different header flows, larger memory space is required, and memory full may be more likely to occur.

The standard specification file for RoHC merely recites that when free space of the memory of the decompressor is insufficient (e.g., the free space is insufficient to store new contexts), the decompressor may send a feedback with reject option to the compressor; and when the compressor receives the feedback with reject option, the compressor stops compressing the packet stream for some time. Therefore, memory full handling must be provided for RoHC to make effective use of the band resources of wired or wireless networks.

SUMMARY OF THE INVENTION

In view of the issues of the prior art, an object of the present invention is to provide Robust Header Compression (RoHC) compressors and decompressors, so as to make effective use of the band resources of wired or wireless networks.

A data processing method used in a RoHC compressor is provided. The data processing method is applied to a compressor of a transceiver. The compressor includes a processor and a memory, and the memory stores multiple contexts. The method includes the following steps: receiving a header flow; freeing at least one of the contexts but not freeing the context corresponding to the uncompressed profile when free space of the memory is insufficient; compressing the header flow; and transmitting the compressed header flow.

A data processing method used in a RoHC decompressor is also provided. The data processing method is applied to a decompressor of a transceiver. The decompressor includes a processor and a memory, and the memory stores multiple contexts. The method includes the following steps: receiving a compressed header flow; transmitting a static negative-acknowledgement (static-NACK) for a target context, which is not the context corresponding to the uncompressed profile, among the contexts when storage space in the memory allocated to the decompressor is insufficient; freeing the target context; and decompressing and storing the data of the header flow.

A data processing method used in a RoHC compressor is also provided. The data processing method is applied to a compressor of a transceiver. The compressor includes a processor and a memory, and the memory stores multiple contexts. The method includes the following steps: receiving a feedback with reject option specifying a first context; receiving a header flow; and compressing the header flow using the second context corresponding to the header flow when the second context exists in the memory and the second context is different from the first context.

A RoHC compressor is also provided. The RoHC compressor includes a memory and a processor. The memory is configured to store multiple contexts and multiple codes or program instructions. The processor is coupled to the memory and configured to execute the codes or the program instructions to perform the following steps: receiving a header flow; freeing at least one of the contexts but not freeing the context corresponding to the uncompressed profile when free space of the memory is insufficient; compressing the header flow; and transmitting the compressed header flow.

A RoHC decompressor is also provided. The RoHC decompressor includes a memory and a processor. The memory is configured to store multiple contexts and multiple codes or program instructions. The processor is coupled to the memory and configured to execute the codes or the program instructions to perform the following steps: receiving a compressed header flow; transmitting a static negative-acknowledgement (static-NACK) for a target context, which is not the context corresponding to the uncompressed profile, among the contexts when free space of the memory is insufficient; freeing the target context; and decompressing and storing data of the header flow.

A RoHC compressor is also provided. The RoHC compressor includes a memory and a processor. The memory is configured to store multiple contexts and multiple codes or program instructions. The processor is coupled to the memory and configured to execute the codes or the program instructions to perform the following steps: receiving a feedback with reject option specifying a first context; receiving a header flow; and compressing the header flow using the second context corresponding to the header flow when the second context exists in the memory and the second context is different from the first context.

The RoHC compressors and decompressors and the data processing methods of the present invention can free contexts to increase the available memory space when free space of the memory is insufficient. Compared to the conventional technology, the transceiver implementing the present invention does not need to stop compressing the packet stream for some time, thereby making effective use of the band resources of wired or wireless networks.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes Robust Header Compression (RoHC) compressors and decompressors and associated data processing methods. Some or all of the processes of the data processing methods may be implemented by software and/or firmware and can be performed by the compressors or decompressors or their equivalents. A person having ordinary skill in the art can choose components or steps equivalent to those described in this specification to carry out the present invention, which means that the scope of this invention is not limited to the embodiments in the specification.

Figure 1:
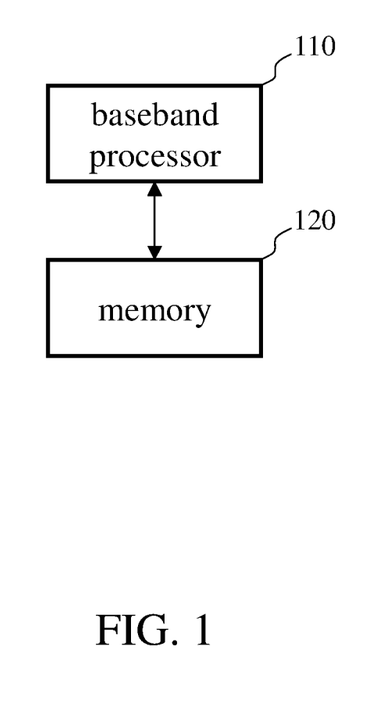
FIG. 1 illustrates a device of a compressor or a decompressor for implementing a Robust Header Compression (RoHC) data processing method of the present invention.

FIG. 1 illustrates a device of a compressor or a decompressor for implementing a Robust Header Compression (RoHC) data processing method of the present invention. A transceiver in a wireless/wired network typically includes a compressor and a decompressor. The compressor or decompressor includes a baseband processor 110 and a memory 120. The memory 120 stores multiple contexts and multiple codes or program instructions, and the baseband processor 110 carries out the functions of the compressor or the decompressor by executing the codes or program instructions.

Figure 2:
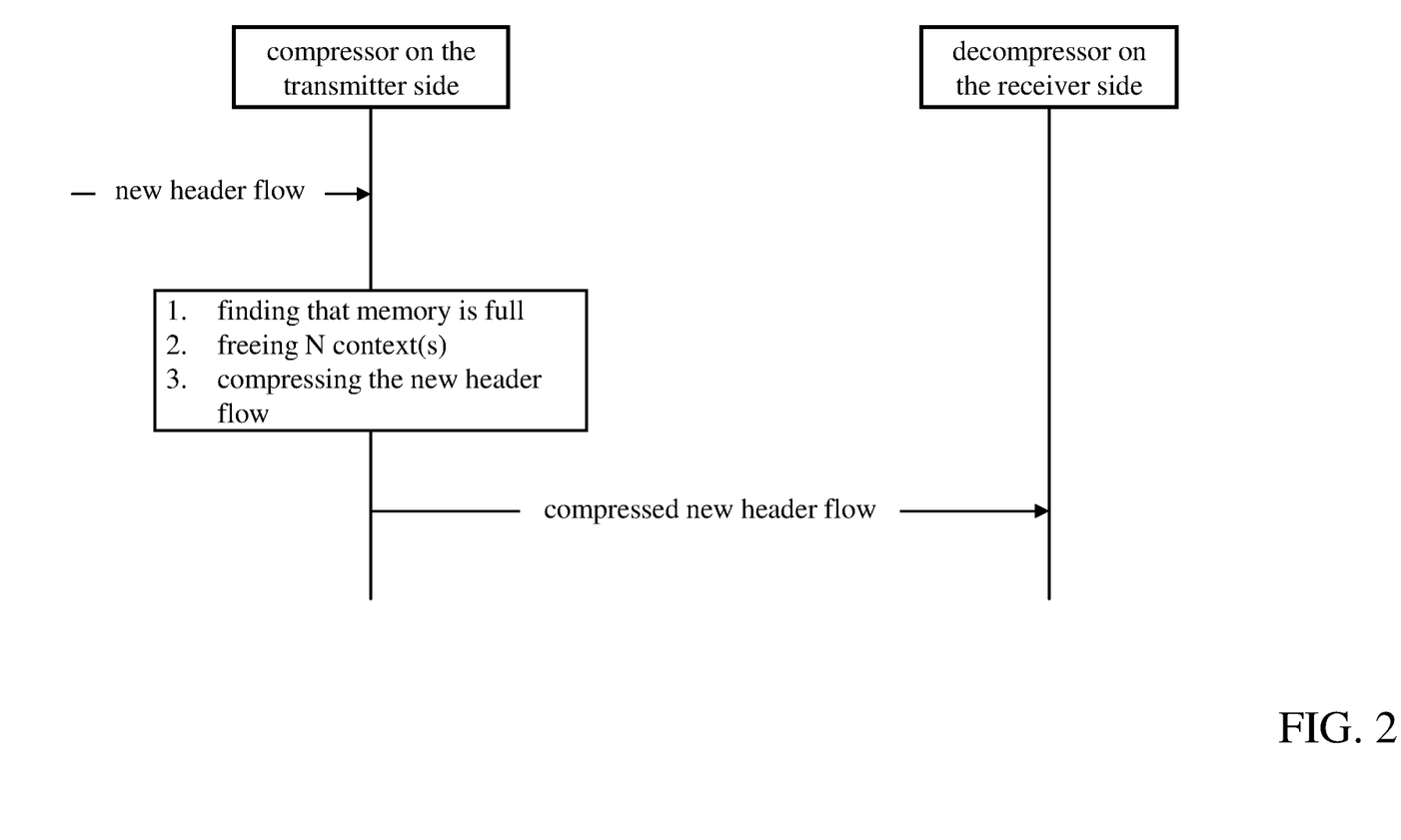
FIG. 2 illustrates a function sequence diagram of a data processing method used in a RoHC compressor according to an embodiment of the present invention.
Figure 3:
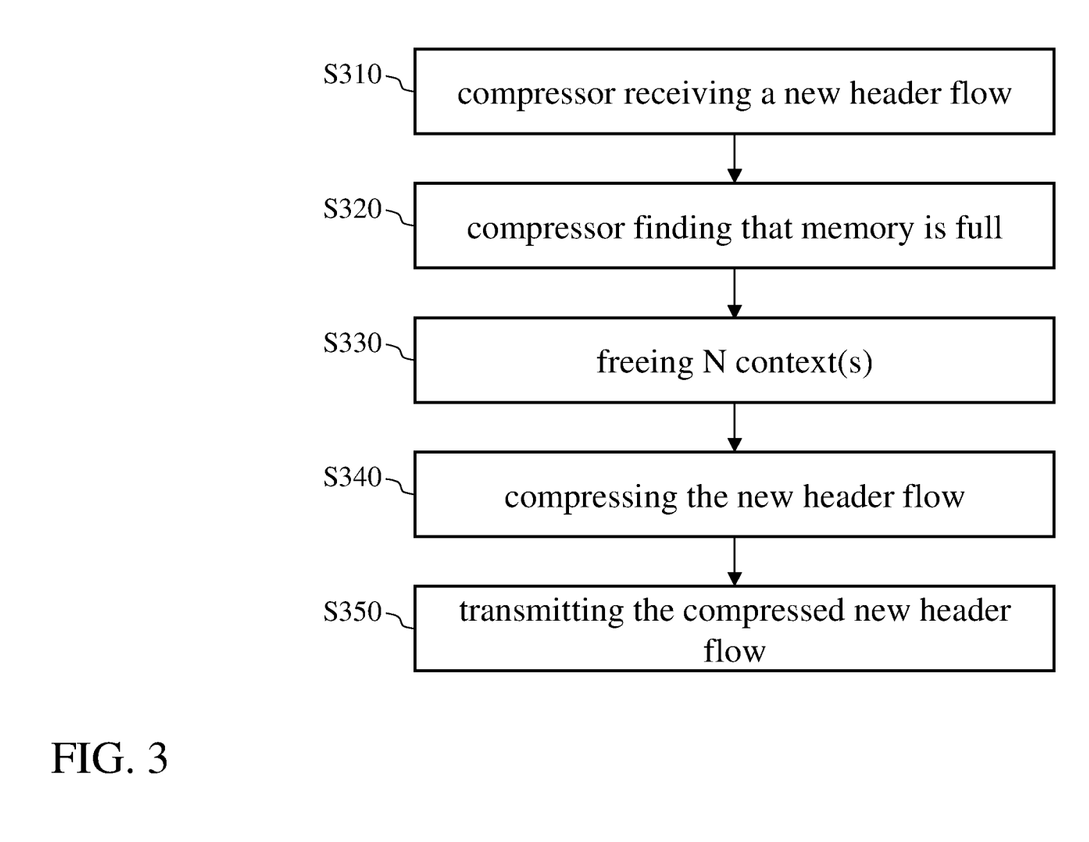
FIG. 3 illustrates a flow chart corresponding to FIG. 2.

FIG. 2 is a function sequence diagram of a data processing method used in a RoHC compressor according to an embodiment of the present invention. FIG. 3 illustrates a flow chart corresponding to FIG. 2. Reference is made to both FIG. 2 and FIG. 3. When the compressor on the transmitter side receives a new header flow (step S310) and finds that free space of the memory is insufficient (e.g., the portion of the memory 120 allocated to the compressor is insufficient to store new context(s)) (step S320), the compressor on the transmitter side frees N context(s) (i.e., the N context(s) in the memory 120 are deleted) (step S330). N is an integer greater than or equal to 1 and is smaller than the total number of contexts stored in the memory 120. Next, the compressor on the transmitter side compresses the new header flow (step S340), and then transmits the compressed new header flow to the decompressor of the receiver on the receiver side (step S350). In some embodiments, $1 \leq N \leq 3$, and the N context(s) are the oldest N context(s) among all contexts, and further, the N context(s) cannot be the context corresponding to the uncompressed profile. After the old context(s) is/are freed, the memory 120 has memory space to store new context(s). As a result, the compressor on the transmitter side can continue to compress the header flow without needing to stop compressing the packet stream for some time.

Figure 4:
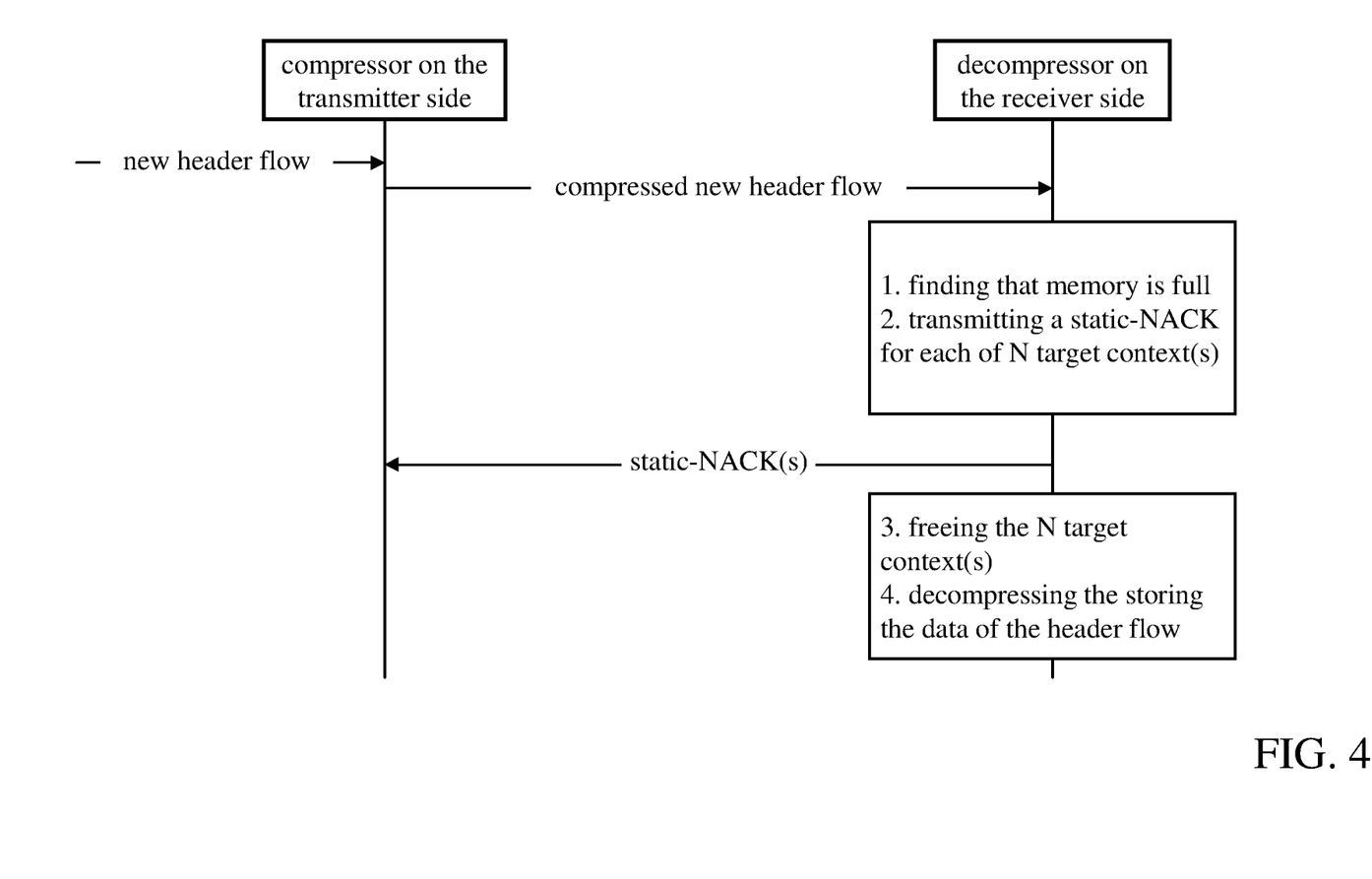
FIG. 4 illustrates a function sequence diagram of a data processing method used in a RoHC decompressor according to an embodiment of the present invention.
Figure 5:
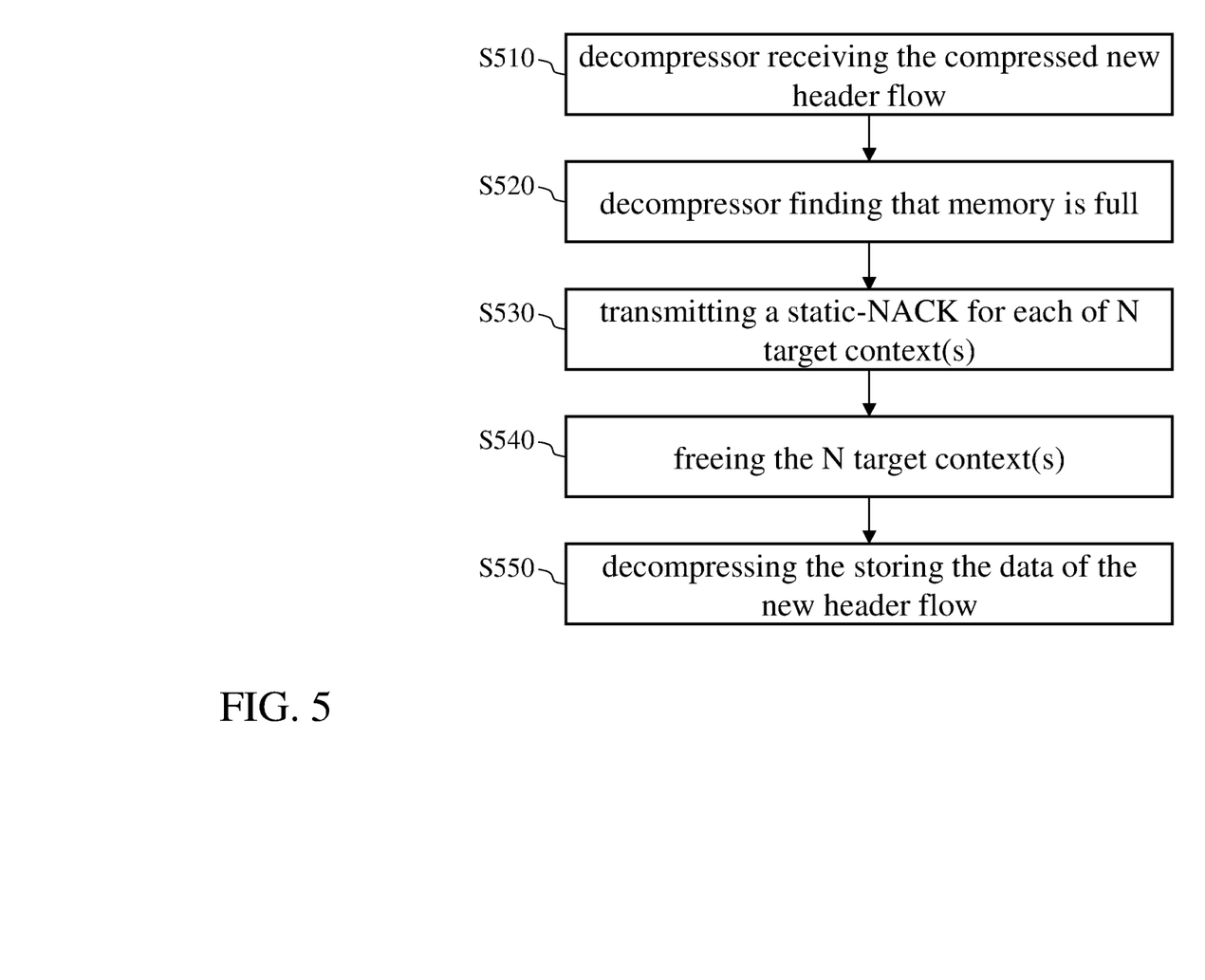
FIG. 5 illustrates a flow chart corresponding to FIG. 4.

FIG. 4 is a function sequence diagram of a data processing method used in a RoHC decompressor according to an embodiment of the present invention. FIG. 5 shows a flow chart corresponding to FIG. 4. Reference is made to both FIG. 4 and FIG. 5. When the decompressor on the receiver side receives a new header flow (step S510) and finds that free space of the memory is insufficient (e.g., the portion of the memory 120 allocated to the decompressor is insufficient to store the new context) (step S520), the decompressor on the receiver side selects N target context(s), and transmits a static negative-acknowledgement (static-NACK) for each of the N target context(s) to the compressor of the transmitter on the transmitter side (step S530). Then, the baseband processor 110 of the decompressor on the receiver side frees the N target context(s) in the memory 120 (step S540), and then stores the data of the new header flow into the memory 120 (step S550). In some embodiments, $1 \leq N \leq 3$, and the N context(s) are the oldest N context(s) among all contexts, and further, the N context(s) cannot be the context corresponding to the uncompressed profile. Note that in step S530, the decompressor on the receiver side sends a static-NACK for each context to be freed. Because the decompressor on the receiver side sends the static-NACK spontaneously or actively, the static-NACK may not carry the sequence number (SN) of the packet. After receiving the static-NACK(s), the compressor on the transmitter side learns that the memory 120 of the decompressor on the receiver side no longer store the context(s) specified by or corresponding to the static-NACK(s). In other words, next time the compressor on the transmitter side is about to transmit a header flow corresponding to any of the context(s), the compressor on the transmitter side needs to start the transmission from the most basic initialization and refresh (IR) packet that is specified by RoHC and contains the complete header message. The transmission of the IR packet aims to require the decompressor of the receiver on the receiver side to recreate the context corresponding to the header flow.

In the embodiment of FIG. 4 and FIG. 5, when free space of the memory is insufficient, the decompressor on the receiver side frees old context(s) in the local memory and notifies the compressor on the transmitter side of the freed context(s). In this way, the compressor on the transmitter side can continue to compress the header flow without needing to stop the compression of the packet stream for some time due to memory full on the decompressor on the receiver side.

Figure 6:
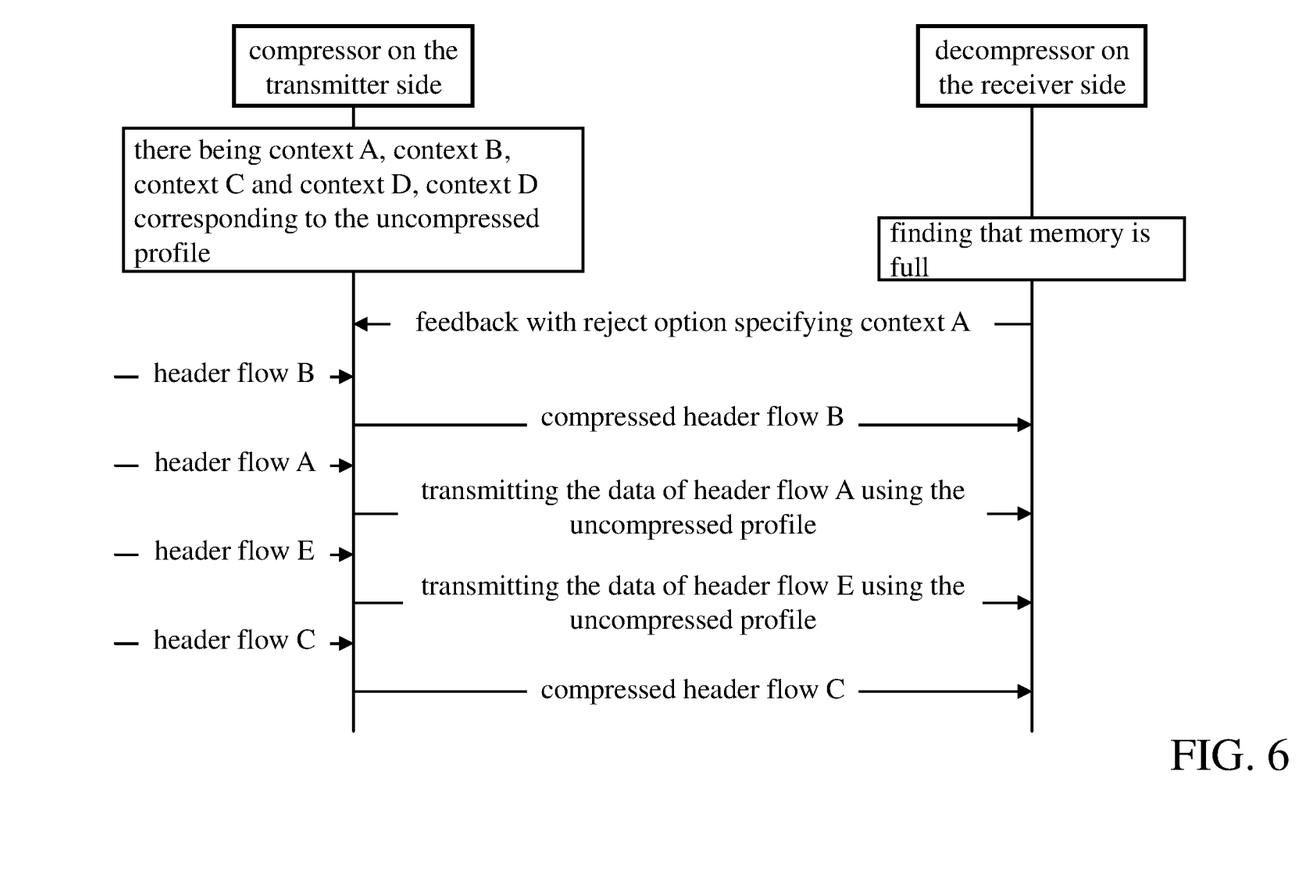
FIG. 6 illustrates a function sequence diagram of a data processing method used in a RoHC compressor according to another embodiment of the present invention.
Figure 7:
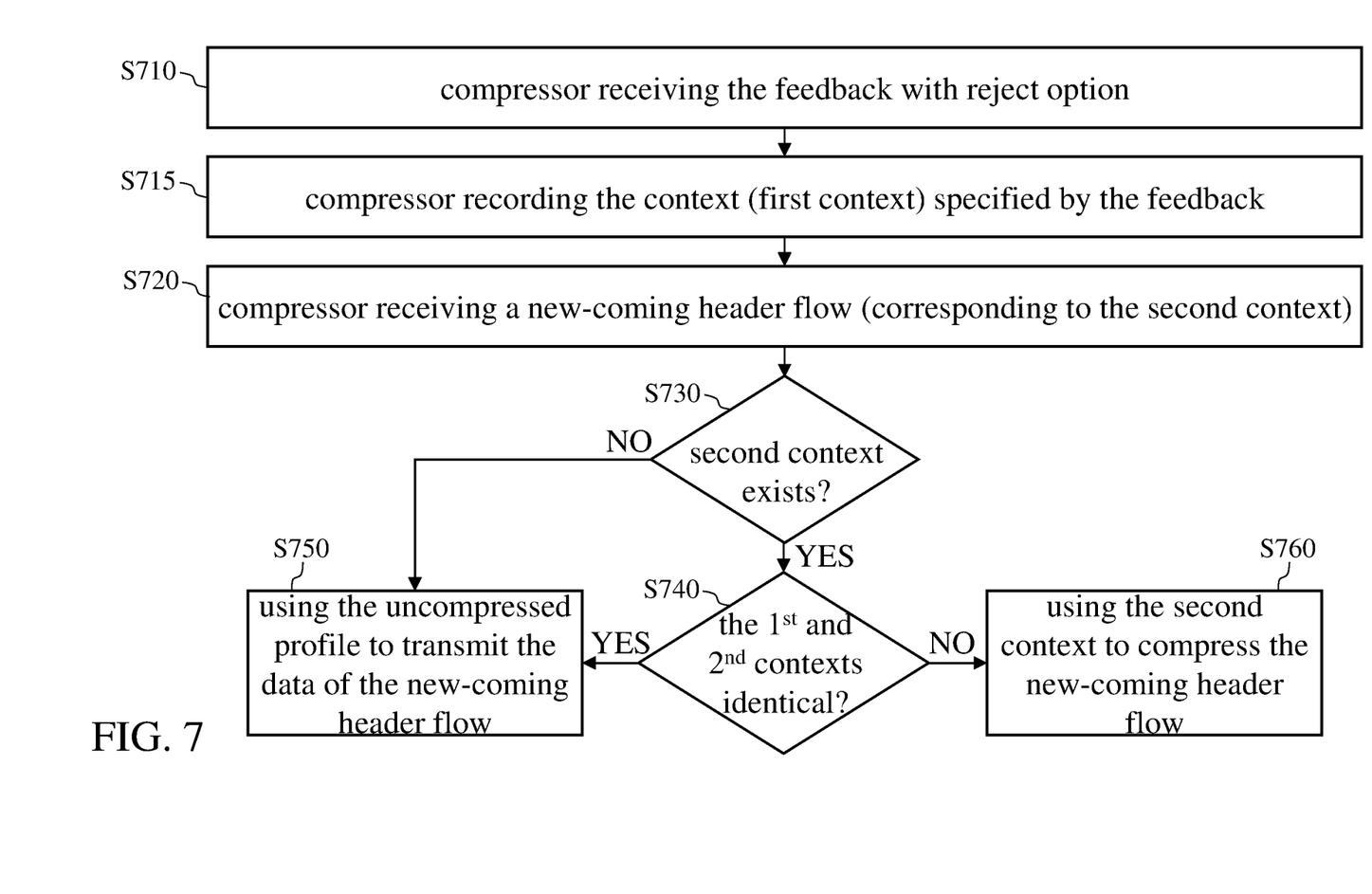
FIG. 7 illustrates a flow chart corresponding to FIG. 6.

FIG. 6 is a function sequence diagram of a data processing method used in an event that the memory of a RoHC compressor on the transmitter side is full according to another embodiment of the present invention. FIG. 7 shows a flow chart corresponding to FIG. 6. Reference is made to both FIG. 6 and FIG. 7. It is assumed that the memory 120 of the compressor on the transmitter side originally stores context A, context B, context C and context D, and context D corresponds to the uncompressed profile. When the decompressor on the receiver side finds that free space of the memory is insufficient, the compressor on the transmitter side receives the feedback with reject option from the decompressor on the receiver side (step S710), and records the context (first context) specified by the feedback (step S715). It is assumed here that the context specified by the feedback with reject option is context A (i.e., the first context is context A). Then, when the compressor receives a new-coming header flow (corresponding to the second context) (step S720), the baseband processor 110 of the compressor on the transmitter side first determines whether the memory 120 stores the second context (step S730). If the second context is not stored in the memory 120 (e.g., the compressor on the transmitter side receives header flow E, step S730 being NO), the baseband processor 110 transmits the data of the new-coming header flow using the uncompressed profile (Step S750). If the memory 120 stores the second context (e.g., header flow A, B or C is received, step S730 being YES), the baseband processor 110 further determines whether the second context is identical to the first context (step S740). If the second context is the first context (e.g., header flow A is received, step S740 being YES), the baseband processor 110 transmits the data of the new-coming header flow using the uncompressed profile (step S750). If the second context is not the first context (e.g., header flow B or header flow C is received, step S740 being NO), the baseband processor 110 compresses the new-coming header flow using the second context (Step S760).

In the embodiment of FIG. 6 and FIG. 7, after receiving the feedback with reject option, the compressor on the transmitter side does not need to stop compressing the packet stream for some time but can determine whether to compress the new-coming header flow according to the context corresponding to the new-coming header flow. Context A in the above example may be the oldest context of the decompressor on the receiver side. After the compressor on the transmitter side receives the feedback with reject option for context A, the baseband processor 110 of the compressor on the transmitter side may free or not free context A in the memory 120.

In the above embodiment, the baseband processor 110 stores the contexts in the memory 120 in the form of a linked list, and each context is a node in the linked list. When the compressor on the transmitter side or the decompressor on the receiver side receives a header data, the baseband processor 110 moves the context corresponding to the header data to the last node of the linked list. In this way, the context corresponding to the first node of the linked list is the oldest of all contexts. The manipulation of the linked list is well known to those of ordinary skill in the art and is thus omitted for brevity. Note that the context corresponding to the uncompressed profile can be stored in the linked list but will never be freed.

Since a person having ordinary skill in the art can appreciate the implementation detail and the modification thereto of the present method invention through the disclosure of the device invention, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A Robust Header Compression (RoHC) compressor comprising:
   a memory configured to store a plurality of contexts in a linked list and store a plurality of codes or program instructions; and
   a processor coupled to the memory and configured to execute the codes or the program instructions to perform following steps:
   receiving a header flow;
   freeing a context corresponding to the first node of the linked list when free space of the memory is insufficient;
   compressing the header flow; and
   transmitting the compressed header flow.

2. A Robust Header Compression (RoHC) decompressor comprising:
   a memory configured to store a plurality of contexts and a plurality of codes or program instructions; and
   a processor coupled to the memory and configured to execute the codes or the program instructions to perform following steps:
   receiving a compressed header flow;
   selecting a target context among the contexts;
   transmitting a static negative-acknowledgement (static-NACK) for the target context among the contexts when the contexts are currently stored in the memory and free space of the memory is insufficient;
   freeing the target context; and
   decompressing and storing data of the header flow.

3. The RoHC decompressor of claim 2, wherein the contexts are stored in a linked list, and the step of freeing the target context comprises:
   freeing a context corresponding to the first node of the linked list.

4. A Robust Header Compression (RoHC) compressor comprising:
   a memory configured to store a plurality of contexts and a plurality of codes or program instructions; and
   a processor coupled to the memory and configured to execute the codes or the program instructions to perform following steps:
   receiving a feedback specifying a first context from a RoHC decompressor, the feedback indicating insufficient memory space at the RoHC decompressor;
   receiving a header flow; and
   compressing the header flow using a second context corresponding to the header flow when the second context exists in the memory and the second context is different from the first context.

5. The RoHC compressor of claim 4 further comprising:
   when the second context corresponding to the header flow exists in the memory and the second context is identical to the first context, data of the header flow is transmitted using an uncompressed profile.

* * * * *